United States Patent

Yabuki et al.

[11] Patent Number: 5,527,609
[45] Date of Patent: Jun. 18, 1996

[54] CRIMPED POLYBENZAZOLE STAPLE FIBER AND MANUFACTURE THEREOF

[75] Inventors: Kazuyuki Yabuki; Takaharu Ichiryu; Tadao Kuroki; Mitsuhiro Sakuda, all of Ohtsu, Japan

[73] Assignee: Toyo Boseki Kabushiki Kaisha, Osaka, Japan

[21] Appl. No.: 425,493

[22] Filed: Apr. 20, 1995

[30] Foreign Application Priority Data

Apr. 20, 1994 [JP] Japan .................. 6-105897
Aug. 3, 1994 [JP] Japan .................. 6-182421
Nov. 16, 1994 [JP] Japan .................. 6-281738

[51] Int. Cl.⁶ .................................. D02C 3/00
[52] U.S. Cl. ............. 428/359; 428/394; 528/377; 528/313; 528/321; 528/182
[58] Field of Search .................. 428/364, 359, 428/394; 528/182, 377, 313, 321, 185, 172

[56] References Cited

U.S. PATENT DOCUMENTS

| | | |
|---|---|---|
| 4,359,567 | 11/1982 | Evers . |
| 4,533,692 | 8/1985 | Wolfe et al. . |
| 4,533,693 | 8/1985 | Wolfe et al. . |
| 4,533,724 | 8/1985 | Wolfe et al. . |
| 4,544,576 | 10/1985 | Chu et al. . |
| 4,578,432 | 3/1986 | Teai et al. . |
| 4,703,103 | 10/1987 | Wolfe et al. . |
| 4,772,678 | 9/1988 | Sybert et al. . |
| 4,847,350 | 7/1989 | Harris . |
| 5,089,591 | 2/1992 | Gregory et al. . |
| 5,393,478 | 2/1995 | Sen et al. . |

FOREIGN PATENT DOCUMENTS 61-58568   3/1986   Japan .

*Primary Examiner*—N. Edwards
*Attorney, Agent, or Firm*—Leydig, Voit & Mayer, Ltd.

[57] ABSTRACT

Crimped polybenzazole staple fibers which satisfy the following specifications at the same time:
(1) $2 \leq$ number of crimps (number/inch) $\leq 40$
(2) $2 \leq$ crimp index (%) $\leq 30$
(3) $0.3 \leq$ crimp index/number of crimps $\leq 3.0$; methods for manufacturing crimped polybenzazole staple fibers; and the rotary cutter therefor. The crimped polybenzazole staple fibers of the present invention are superior in crimp property and are useful for manufacturing spun yarn and unwoven fabric. According to the method of the present invention, crimped polybenzazole staple fibers superior in spinnability can be manufactured with ease. In addition, the cutting blade of the present invention stands a long time use for manufacturing staple fibers from a continuous filaments tow of high tenacity fibers.

1 Claim, 4 Drawing Sheets

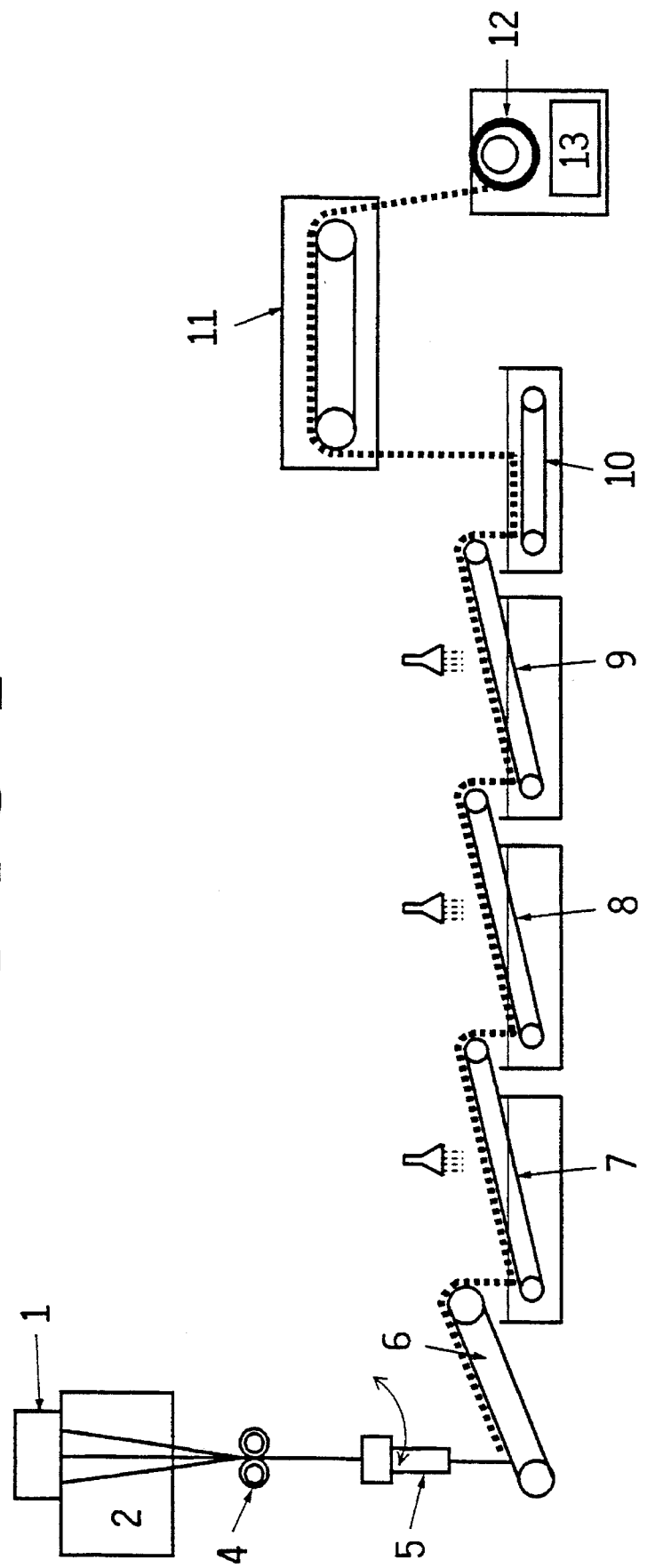

FIG 3(a)     FIG 3(b)
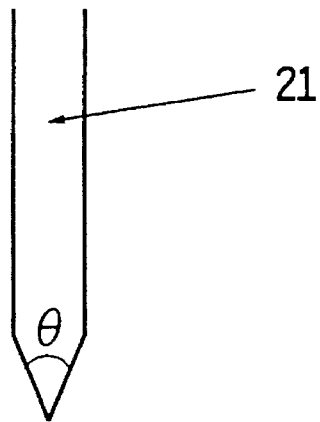
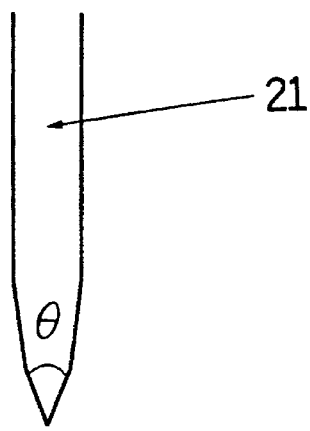
FIG 4
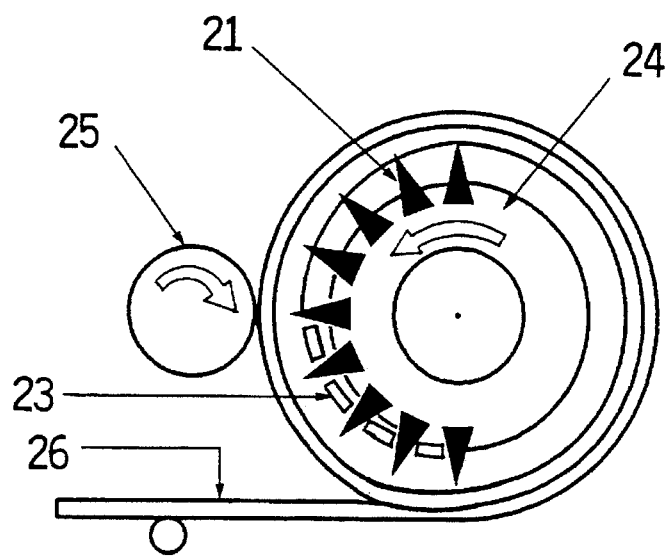

CRIMPED POLYBENZAZOLE STAPLE FIBER AND MANUFACTURE THEREOF

FIELD OF THE INVENTION

The present invention relates to a polybenzazole fiber having high strength and high modulus. More particularly, the present invention relates to a crimped polybenzazole staple fiber usable for spun yarn and nonwoven fabric, and to a method for manufacturing same.

The present invention also relates to a method for manufacturing staple fibers from high tenacity fibers, and more particularly, it relates to a rotary cutter to be used for manufacturing staple fibers.

BACKGROUND OF THE INVENTION

Polybenzazole fibers have high strength and high modulus which are vastly greater than those of known super fibers Dyneema and Kevlar (both being trademarks). Heretofore, the high strength and high modulus of polybenzazole fibers have prevented production of high quality crimped staple fibers. Continuous fibers are cut and the obtained non-crimped staple fibers have been carded. This method results in frequent occurrence of neps during carding, making high quality card web hard to obtain, and spun yarn and nonwoven fabric having good quality cannot be manufactured.

In addition, various high tenacity fibers including polybenzazole fiber have very high strength and high modulus as compared with conventional polyester, nylon and acrylic fibers, to the extent that problems occur when conventional processing steps for the above-mentioned known fibers are applied. For manufacturing staple fibers from continuous filaments, for example, synthetic fibers such as polyester and acrylic fibers are manufactured by feeding a continuous filaments tow in a crimper box to afford crimps, and cutting the filaments tow with a rotary cutter wherein cutting blades are radially installed on the periphery of a rotor drum with an approximately equal pitch with the blades facing the peripheral direction (Japanese Patent Publication No. 58568/1986). In this case, the angle of the cutting blades of the rotary cutter is generally set to 30° for polyester fibers and 45° for acrylic fibers. When the fibers having a filament tenacity of not less than 20 g/d are cut using the same rotary cutter blade, however, the damage to the cutter blade occurs in a short time, and the blade cannot stand a long time use.

It is therefore an object of the present invention to provide crimped polybenzazole staple fibers allowing production of a high quality card web with less neps, and a method for producing them.

Another object of the present invention is to provide a rotary cutter having a cutting blade permitting a long time use, which is used for cutting a continuous filaments tow of high tenacity fibers to give staple fibers.

SUMMARY OF THE INVENTION

The present inventors studied the cause of frequent occurrence of neps during carding of non-crimped staple fibers, and found that linear fibers have poor degree of slip, and when fed, the fibers frequently go into the area between needles on the cylinder card and become neps upon abrasion and so on. Then, the present inventors considered that imparting crimps of a certain quality to the polybenzazole fibers before feeding would improve the degree of slip and reduce occurrence of neps, and studied the method of imparting crimps and cutting.

Accordingly, the present invention relates to crimped polybenzazole staple fibers satisfying the following specifications at the same time:

(1) $2 \leq$ number of crimps (number/inch) $\leq 40$ (2) $2 \leq$ crimp index (%) $\leq 30$ (3) $0.3 \leq$ crimp index/number of crimps $\leq 3.0$ The present invention also relates to a method for manufacturing crimped polybenzazole staple fibers, comprising subjecting a continuous polybenzazole filaments tow to crimping in a crimper box and cutting the obtained crimped filaments tow with a rotary cutter.

The present invention further relates to a method for manufacturing crimped polybenzazole staple fibers, comprising extruding a spinning dope comprising polyphosphoric acid and polybenzazole from a spinneret and crimping the obtained dope filaments before coagulation; a method for manufacturing the above-mentioned crimped polybenzazole staple fibers, comprising extruding a spinning dope comprising polyphosphoric acid and polybenzazole from a spinneret, imparting, with a godet roller, a certain speed to the dope filaments obtained, and crimping the dope filaments before contact with a coagulation solution; a method for manufacturing the above-mentioned crimped polybenzazole staple fibers, comprising extruding a spinning dope comprising polyphosphoric acid and polybenzazole from a spinneret, crimping the dope filaments obtained, pulling-off the filaments with an aspirator, catching and transporting same on a net conveyor, and washing and drying same on the net conveyor; a method for manufacturing the above-mentioned crimped polybenzazole staple fibers, comprising extruding a spinning dope comprising polyphosphoric acid and polybenzazole from a spinneret, crimping the dope filaments obtained, pulling-off the filaments with an aspirator, catching and transporting same on a net conveyor, washing and drying same on the net conveyor, and cutting same with a rotary cutter; and a method for manufacturing the above-mentioned crimped polybenzazole staple fibers, wherein the spinning dope is a polyphosphoric acid solution having a polybenzazole concentration of not less than 10% by weight.

The present invention still further relates to a method for manufacturing staple fibers, comprising cutting a continuous filaments tow of high tenacity fibers having a filament tenacity of not less than 20 g/d with a cutting blade having a tip angle of not less than 46° and not more than 90°; the above-mentioned method for manufacturing staple fibers, wherein the tip angle of the cutting blade is not less than 55° and not more than 90°; the above-mentioned method for manufacturing staple fibers, wherein the continuous filaments tow comprises high tenacity fibers having a filament tenacity of not less than 30 g/d; the above-mentioned method for manufacturing staple fibers, wherein the continuous filaments tow comprises polybenzazole fibers having a filament tenacity of not less than 20 g/d; the above-mentioned method for manufacturing staple fibers, comprising using a cutting apparatus wherein a multitude of cutting blades are installed on the periphery of a rotor drum with an approximately equal pitch along the peripheral direction of the rotor, with the blade edge facing toward the outside of the rotor; and the above-mentioned method for manufacturing staple fibers, comprising using a cutting apparatus wherein a multitude of cutting blades are installed on the periphery of the rotor with an approximately equal pitch along the peripheral direction of the rotor, with the blade edge facing toward the inside of the rotor.

The present invention also relates to a rotary cutter having a cutting blade with a tip angle of not less than 46° and not more than 90°; and the above-mentioned rotary cutter having a cutting blade with a tip angle of not less than 55° and not more than 90°.

BRIEF DESCRIPTION OF THE DRAWINGS

FIG. 2 is a schematic showing of the apparatus used in Example 8 to be described later.

FIG. 3(a) is a front view of the cutting blade to be used in the present invention, which has a single-stair blade point.

FIG. 3(b) is a front view of the cutting blade to be used in the present invention, which has a two-stair blade point.

FIG. 4 is a sectional view of the cutting apparatus to be used in the present invention.

DETAILED DESCRIPTION OF THE INVENTION

Figure 1:
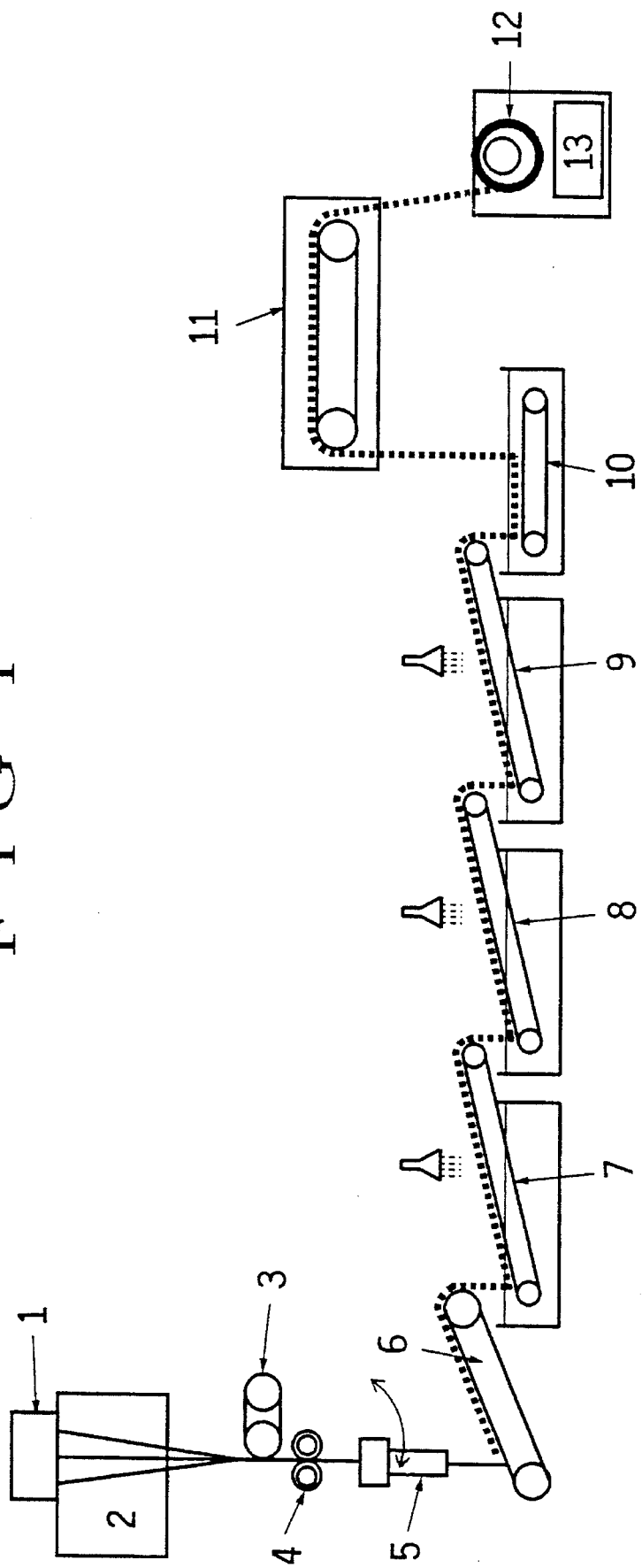
FIG. 1 is a schematic showing of the apparatus used in Example 7 to be described later.

As used herein, the polybenzazole fiber means the fiber made from a polybenzazole polymer, and polybenzazole (PBZ) to be used in the present invention includes, for example, polybenzoxazole (PBO) homopolymer, polybenzothiazole (PBT) homopolymer, and random, sequential or block copolymers of PBO and PBT.

The random, sequential or block copolymers of polybenzoxazole and polybenzothiazole are described in, for example, Wolfe et al., Liquid Crystalline Polymer Compositions, Process and Products, U.S. Pat. No. 4,703,103 (Oct. 27, 1987), Liquid Crystalline Polymer Compositions, Process and Products, U.S. Pat. No. 4,533,692 (Aug. 6, 1985), Liquid Crystalline Poly(2,6-benzothiazole) Compositions, Process and Products, U.S. Pat. No. 4,533,724 (Aug. 6, 1985) and Liquid Crystalline Polymer Compositions, Process and Products, U.S. Pat. No. 4,533,693 (Aug. 6, 1985); Evers, Thermooxidatively Stable Articulated p-Benzobisoxazole and p-Benzobisthiazole Polymers, U.S. Pat. No. 4,359,567 (Nov. 16, 1982); and Tsai et al., Method for Making Heterocyclic Block Copolymer, U.S. Pat. No. 4,578,432 (Mar. 25, 1986).

The structural unit to be comprised in PBZ polymer is preferably selected from the structural units included in liotropic liquid crystal polymer. That is, the PBZ polymer to be used in the present invention preferably substantially has one or more structural units selected from the following formulas (a) to (h), and more preferably substantially has one or more structural units selected from the following formulas (a) to (d).

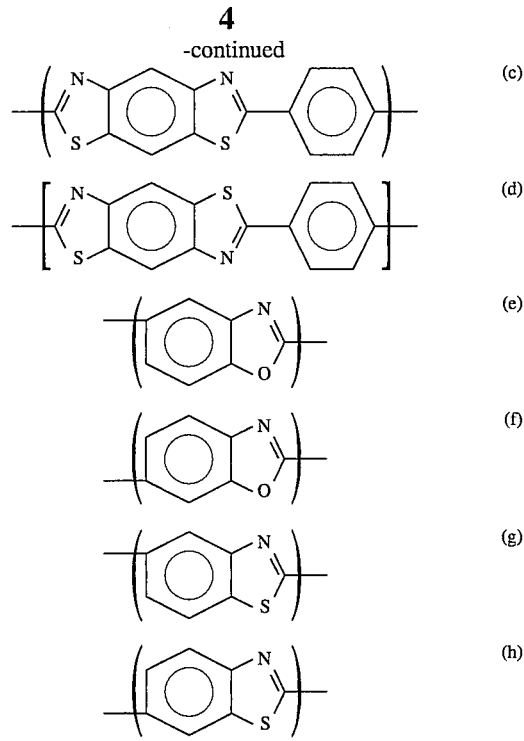

In the present invention, it is preferable to use a spinning dope containing a liotropic liquid crystal polybenzazole polymer, that is, polybenzoxazole, polybenzothiazole or a copolymer thereof.

Suitable solvent for forming a dope of PBZ polymer is, for example, cresol or a non-acidifying acid capable of dissolving said polymer. Examples of the acid solvent include polyphosphoric acid, methanesulfonic acid, high concentration sulfuric acid and mixtures thereof, with preference given to polyphosphoric acid and methanesulfonic acid. The acid solvent is most preferably polyphosphoric acid.

The polymer concentration in the solution obtained above is preferably not less than about 7% by weight, more preferably not less than about 10% by weight, and most preferably not less than about 14% by weight, from the aspects of spinnability and productivity. A maximum polymer concentration is restricted by practical handling property such as polymer solubility and dope viscosity. The polymer concentration generally does not exceed 20% by weight due to such critical elements.

A polymer, copolymer or dope suitable for the present invention is synthesized by a known method such as the following. For example, it is synthesized according to the method of U.S. Pat. No. 4,533,693 (Aug. 6, 1985) to Wolfe et al., U.S. Pat. No. 4,772,678 (Sep. 20, 1988) to Sybert et al., or U.S. Pat. No. 4,847,350 (Jul. 11, 1989) to Harris. According to U.S. Pat. No. 5,089,591 (Feb. 18, 1992) to Gregory et al., polymerization of PBZ at high reaction speed in a dehydrative acid solvent under the conditions of relatively high temperature and high shear rate is possible.

The crimped polybenzazole staple fibers of the present invention are manufactured from the fiber obtainable from the above-mentioned polybenzazole dope according to the method to be described later. The said crimped polybenzazole staple fibers satisfy the following specifications at the same time:

(1) 2≦number of crimps (number/inch)≦40

(2) 2≦crimp index (%)≦30

(3) 0.3≦crimp index/number of crimps≦3.0

The above-mentioned crimp property greatly affects spinnability and productivity of nonwoven fabric.

The crimped polybenzazole staple fibers of the present invention are required to have the number of crimps per inch of not less than 2 and not more than 40, preferably not less than 6 and not more than 30, and more preferably not less than 8 and not more than 20. When the number of crimps is less than 2, the degree of slip becomes insufficient to cause poor throughput of a card, while when the number of crimps is more than 40, filamentation property becomes poor to cause occurrence of neps. In this case, an increased number of crimps gives rise to a damage to the fiber to cause lower mechanical property.

The crimp index (%) is required to be not less than 2 and not more than 30, preferably not less than 4 and not more than 20, and more preferably not less than 6 and not more than 15, for the same reasons as described above.

The ratio of the crimp index to the number of crimps (crimp index/number of crimps) is important in the present invention. The crimp index/number of crimps needs to be not less than 0.3 and not more than 3.0, preferably not less than 0.6 and not more than 1.6, and more preferably not less than 0.8 and not more than 1.4. When the crimp index/number of crimps is less than 0.3, the number of crimps needs to be increased to achieve the above-mentioned crimp index, which causes occurrence of neps and the like, whereas when the crimp index/number of crimps is more than 3.0, bulkiness causes difficulty in handling.

The methods for manufacturing crimped polybenzazole staple fibers from the above-mentioned dope are described in the following.

Production 1

In this method, a continuous filaments tow comprising polybenzazole fibers is subjected to crimping using a crimper box and said crimped filaments tow is cut with a rotary cutter.

Filaments are made from a dope by a known dry spinneret-wet spinning method. For example, a dope is extruded from a spinneret to give fiber-shaped dope, which is then passed through air, brought into contact with a liquid, in which the polymer is insoluble, to allow coagulation. After the coagulation, the residual solvent in the fiber is washed away with water. In view of the desirable stability of mechanical property of the fiber, the fiber is preferably washed with water to make the residual solvent concentration in the fiber not more than about 5,000 ppm, more preferably not more than about 3,000 ppm. The fiber washed with water generally has a residual water content of from 30% by weight to 200% by weight. The fiber is successively dried to make the residual water content not more than 5% by weight, preferably not more than 3% by weight. The method of drying is subject to no particular limitation, and drying using electric furnace, heat roller, heated inert gas and the like can be employed. After drying the fiber, a heat treatment at high temperature may be applied to improve tensile modulus of the fiber.

The average tensile strength of the fiber after drying is at least not less than 7 g/d and generally not less than 30 g/d. The tensile modulus of the fiber after drying is at least not less than 1,000 g/d and generally not less than 1,200 g/d.

The above-mentioned fibers after drying or after heat treatment following drying are bundled in plurality to give a continuous filaments tow.

Then, the continuous filaments tow is treated in a crimper box to impart crimps. The above-mentioned crimp property is achieved by this treatment. To be specific, a tow having a predetermined crimp property can be manufactured by adjusting the temperature of the tow before entering the crimper, additional humidity, treatment speed, treatment pressure in the crimper and the like.

The crimped tow is cut with a rotary cutter, such as the one wherein cutting blades are radially installed between the slots formed on a pair of counter-opposite rotors, to give high quality crimped staple fibers. While cutting can be also done using a cutter other than a rotary cutter, such as guillotine cutter, rotary cutter is superior from the aspect of productivity.

The crimping step and cutting step may be continuously or discontinuously conducted.

Production 2

The crimped polybenzazole staple fibers may be manufactured by, besides the above-mentioned method, extruding a spinning dope comprising polyphosphoric acid and polybenzazole from a spinneret and crimping the obtained dope filaments prior to contact with a coagulation solution. This method facilitates manufacture of crimped polybenzazole staple fibers.

For example, a spinning dope comprising polyphosphoric acid and polybenzazole is melt spun from a spinneret. The dope filaments thus discharged have an extremely high elongation viscosity to the extent that the term "drawing" rather than "spinning" more accurately expresses the actual condition. A certain speed is afforded to the dope filaments by a godet roller, or a certain speed is afforded when the dope filaments are taken up by a gear and applied with crimps, after which the dope filaments are drafted in a so-called air gap. When a godet roller is used, the dope filaments are crimped by a gear crimper. The filaments are taken up by an aspirator and caught on a net conveyor. The filaments tow is thereafter extracted or coagulated, dried and cut to give crimped polybenzazole staple fibers with ease.

The above-mentioned production method is explained in more detail by reference to FIG. 1. In the Figures to be described hereafter, the reference symbols mean the following.

1: spinning head 2: quench chamber 3: godet roller 4: gear crimper 5: compressed air aspirator 6: crimped fiber catch net 7,8: extraction bath or coagulation bath net conveyor 9: neutralization bath net conveyor 10: water bath net conveyor 11: drier 12: rotary cutter 13: staple box 21: cutting blade 22: tip angle 23: staple fiber 24: rotor 25: presser roller 26: continuous filaments tow The dope polymerized as described above is supplied to a spinning part (spinning head 1) and extruded from a spinneret generally at a temperature of not less than 100° C. While the small holes in the spinneret are generally arranged in plurality to form a circle or lattice, any other arrangement may be employed. The number of the small holes in the spinneret is not subject to any particular limitation as long as they are disposed at such a hole density that avoids melt-adhesion of the extruded dope filaments.

The dope filaments (filaments before extraction of polyphosphoric acid) extruded from the spinneret are crimped by a gear crimper 4 and drawn in a non-coagulation gas. For further stabilization of the spinning, a stress isolating member is desirably installed upstream from the gear crimper. A quench chamber 2 installed between the gear crimper or stress isolating member, and the spinneret for cooling the filaments with cooling air is effective for increasing spinning rate. The gear crimper 4 is desirably formed from or processed, on the surface thereof, with a material having good peeling-off property. The stress isolating member generally comprises a godet roller 3, and the roller is desirably made from a corrosion-resistant material.

Generally, it is not common to crimp the extruded dope filaments during wet spinning. However, a polyphosphoric acid solution having a polybenzazole concentration of not less than 10% by weight has an extremely high viscosity and is easily solidified by cooling after extrusion of dope filaments, thereby allowing easy crimping of the filaments. In addition, although the substantially void tension along the filament direction during the crimping step can cause possible relaxation of molecular orientation, such relaxation does not actually occur, since relaxation time of the polybenzazole molecules is extremely long, so that the orientation of molecular chain is not reduced by the crimping step, thus causing no substantial decrease in the strength and modulus.

The crimped filaments are drawn by an aspirator 5 and caught by a catching device such as a net conveyor 6. The catching atmosphere for a fiber tow may be either liquid or gas. The fiber tow caught on the net conveyor 6 is successively extracted or coagulated (7, 8) and finally adjusted to have a phosphoric acid content of the fiber tow of not less than 99.0%, preferably not less than 99.5% in an extraction bath or coagulation bath. The fiber tow is neutralized with an aqueous solution of sodium hydroxide (9) and washed (10) with water.

While the liquid to be used as an extraction or coagulation medium in the present invention is subject to no particular limitation, it is preferably water, aqueous polyphosphoric acid solution or methanol, in which polybenzazole is substantially insoluble. Alternatively, the extraction bath or coagulation bath is divided into plural steps of the bath to make the concentration of the aqueous solution of phosphoric acid and the like sequentially smaller and finalize the step with washing with water.

The fiber tow after washing with water is dried together with the catching member such as a net conveyor, by a drier 11 with high temperature air. The filaments constituting the fiber tow thus obtained have sufficient strength of not less than 20 g/d and sufficiently high modulus of not less than about 700 g/d. A heat treatment at not less than 350° C. immediately thereafter or separately increases the modulus of the filament to not less than 1300 g/d.

Said fiber tow is immediately or separately cut with a rotary cutter 12 and accumulated as crimped staple fibers in a staple box 13.

The crimped polybenzazole staple fibers thus obtained can be used in 100% said staple fiber content or in combination with other fibers such as synthetic fibers (e.g. polyester fiber, nylon fiber and acrylic fiber) and natural fibers (e.g. cotton and wool).

The method for producing a spun yarn from said crimped polybenzazole staple fibers include cotton spinning and worsted spinning, and the method for producing nonwoven fabric therefrom include those generally employed for this purpose such as dry nonwoven fabric process and wet nonwoven fabric process.

The method for producing staple fibers from high tenacity fibers, which is characterized by the use of a cutting blade having a tip angle of not less than 46° and not more than 90° for cutting a continuous filaments tow of high tenacity fibers having a filament tenacity of not less than 20 g/d is described in the following. This cutting blade can be also used for the rotary cutter to be used for producing the above-mentioned crimped polybenzazole staple fibers (Productions 1 and 2).

The high tenacity fiber having a filament tenacity of not less than 20 g/d is the fiber having such strength when determined by the method to be described later, and is exemplified by aramid fibers such as Kevlar (trademark) and Technora (trademark), ultra high molecular weight polyethylene fibers such as Dyneema (trademark) and Techmilon (trademark), polyarylate fibers such as Vectran (trademark) and polybenzazole (PBZ) fibers.

The method of the present invention is particularly effective when staple fibers are produced from high tenacity fibers having a filament tenacity of not less than 30 g/d or polybenzazole (PBZ) fibers having a filament tenacity of not less than 20 g/d.

The above-mentioned continuous filaments tow of high tenacity fibers is preferably applied with crimps in a crimper box to preferably satisfy the aforementioned crimp property (number of crimps, crimp index and crimp index/number of crimps).

The tip angle of the cutting blade in the present invention refers to the angle θ forming the tip edge of the cutting blade as shown in FIG. 3. When the tip of the blade is formed to have two angles, as shown in FIG. 3(b), the tip angle refers to the angle nearer to the top edge. The angle is not less than 46° and not more than 90°, preferably not less than 55° and not more than 90°. When the angle is less than 46°, the duration of the blade becomes shorter due to the damages given to the blade, and when the angle is more than 90°, cutting resistance becomes greater and undesirable effects in terms of cutting speed and cutting precision are produced.

The material of the blade is preferably a hard metal which is produced by the combination of tungsten carbide, cobalt, titanium carbide, tantalum carbide and the like, or ceramics such as zirconia. In view of the response to a metal detector when the blade is broken, hard metals are most preferable.

The cutting blade to be used in the present invention can be used for various cutting devices including rotary cutters. A typical example thereof is shown in FIG. 4, wherein a continuous filaments tow 26 is wound on the periphery of a drum rotor 24 having numerous cutting blades 21 protruding therefrom, and the continuous filaments tow is guided inbetween a presser roller 25 and the cutting blades, whereby the tow is cut to give staple fibers 23.

When the cutting blades are equipped in the direction toward the inside of a rotor, the cutting apparatus comprises numerous cutting blades protruding toward the inside of the rotor and a presser roller installed inside the rotor. In this case, a continuous filaments tow is wound inbetween the presser roller and the cutting blades in the rotor, whereby the tow is cut to give staple fibers.

The methods for determining various properties described in the present invention are as follows.

Number of crimps: One end of a filament is fixed, a load of 2 mg per denier is applied on the other end, the number of the crimps is counted and the length of the fiber is measured. The obtained values are converted to the number of crimps per inch.

Crimp index: One end of a filament is fixed, a load of 2 mg per denier is applied on the other end, and the length of the fiber (L1) is measured. Then, a load of 50 mg per denier is applied, and the length of the fiber (L2) is measured. The crimp index is calculated by the following formula.

$$\text{Crimp index } (\%) = 100(L2-L1)/L2$$

Filament tenacity: Using a tensil tester (Tensilon manufactured by Orientech Corp.), the maximum stress (g) near the rupture point is measured (test sample length 20 cm, strain rate 20 cm/min). The denier (d) of the test sample to be subjected to the tensile test is determined in advance using a vibroscope, and the value obtained by dividing the maximum stress (g) by the denier (d) is taken as the filament tenacity. The same measurement is repeated with regard to 50 test samples and the mean value is taken as the filament tenacity.

The present invention is described in more detail by the following Examples and Comparative Examples. It is needless to say that the present invention is not limited to these examples.

EXAMPLE 1

A spinning dope comprising 14% by weight of cis-polybenzoxazole having an intrinsic viscosity of 30 dl/g dissolved in polyphosphoric acid was extruded at 160° C. and extrusion amount of 0.122 cc per hole from a nozzle having 334 holes having an orifice diameter of 0.22 mm. The fiber-shaped dope extruded from the nozzle was passed through a 22 cm air gap, drawn therein, passed through a coagulation bath adjusted to about 22° C., successively washed with water through 5 or more pairs of rollers while being carried at a speed of about 200 m/min, dried without being once wound up, applied with a spinning oil, and wound up.

The fibers thus wound were combined into a 30,000 denier tow and crimped in a crimper box having a roller width of 20 mm.

The crimped tow was cut into a predetermined length of 44 mm with a rotary cutter to give staple fibers.

EXAMPLES 2–6, COMPARATIVE EXAMPLES 1–4

Respective staple fibers were obtained in the same manner as in Example 1. Note that Comparative Example 1 provided staple fibers without crimps. The crimp property of each fiber was varied by altering the doctor knife pressure in the crimper box.

The staple fibers obtained in the above-mentioned Examples and Comparative Examples were supplied to a card and the neps in the web were visually examined.

The crimp property of the respective staple fibers obtained in the above-mentioned Examples and Comparative Examples and neps in the web are summarized in Table 1.

TABLE 1

|  | Number of crimps (per inch) | Crimp index (%) | Crimp index/ number of crimps | Neps* in web |
| --- | --- | --- | --- | --- |
| Example 1 | 10.6 | 12.2 | 1.15 | few |
| Example 2 | 13.1 | 10.2 | 0.78 | few |
| Example 3 | 4.5 | 2.5 | 0.56 | few |
| Example 4 | 36.1 | 28.3 | 0.78 | few |
| Example 5 | 12.6 | 4.1 | 0.32 | few |
| Example 6 | 6.7 | 16.8 | 2.51 | few |
| Com. Ex. 1 | 0 | 0 | 0 | many |
| Com. Ex. 2 | 1.5 | 1.1 | 0.73 | many |
| Com. Ex. 3 | 45.2 | 36.1 | 0.80 | many |
| Com. Ex. 4 | 14.2 | 3.1 | 0.22 | many |

Note: *The neps in web was evaluated by visual observation.

As is evident from Table 1, excellent webs with less number of neps were obtained from the crimped staple fibers of the present invention (Examples 1–6), whereas only webs with greater number of neps were obtained from the crimped staple fibers (Comparative Examples 1–4) which do not satisfy the specifications of the present invention.

EXAMPLE 7

A spinning dope comprising 14.0% by weight of polybenzoxazole having an intrinsic viscosity, as measured using a methanesulfonic acid solution at 30° C., of 24.4 dl/g and polyphosphonic acid containing phosphorus pentaoxide in a proportion of 83.17%, which was obtained according to the method of U.S. Pat. No. 4,533,693, was used for spinning. The dope was passed through a metal net filtering material and kneaded and deaerated in a biaxial kneader. The pressure was raised and the polymer dope was kept at 170° C. The dope was spun from a 334-hole spinneret at 170° C. using the apparatus as shown in FIG. 1. The extruded filaments were cooled with a cooling air at 60° C., wound around a godet roller to impart a filament speed of 200 m/min. The filaments were crimped by a gear crimper, drawn by an aspirator which used a compressed air as a supply fluid and caught on a net conveyor. The transport speed of the net conveyor was 20 cm/min. The fiber tow thus caught was introduced into an extraction bath of 10% aqueous phosphoric acid solution at 22°±2° C. together with the net conveyor. The fiber tow caught on the net conveyor was washed with an ion-exchange water in the second extraction bath and immersed in a 0.1N sodium hydroxide solution for neutralization. After washing in a water bath again, the fiber tow was dried in an air drying chamber at 190° C. for 5 minutes. Then, the fiber tow was cut in 44 mm long with a rotary cutter (Eastman cutter) equipped with a tungsten carbide cutting blade to give crimped staple fibers.

A finish was applied to said staple fibers, and the staple fibers were passed through a staple opener and spun. The spinnability was fine including carding, and the staple fibers showed productivity almost as superior as that of polyester staple fibers.

EXAMPLE 8

Staple fibers were manufactured under the same conditions as in Example 7 except that the godet roller was omitted. The obtained staple fibers were applied with a finish, passed through a staple opener and spun. The spinnability was fine including carding, and the staple fibers showed productivity almost as superior as that of polyester staple fibers.

COMPARATIVE EXAMPLE 5

Continuous filaments of polybenzbisoxazol were cut in 44 mm long with an Eastman cutter to give staple fibers. Said non-crimped staple fibers were spun. As a result, sinking occurred during carding, and card web was not obtained.

The staple fiber properties obtained in the above-mentioned Examples and Comparative Examples, and fiber properties of the spun yarn are shown in Table 2.

TABLE 2

|  |  | Example 7 | Example 8 | Com. Ex. 5 |
| --- | --- | --- | --- | --- |
| Filament property |  |  |  |  |
| Denier | denier | 1.5 | 1.5 | 1.5 |
| Tenacity | g/d | 32 | 31 | 38 |
| Tensile modulus | g/d | 730 | 734 | 1186 |
| Elongation at break | % | 4.8 | 4.6 | 3.6 |
| Cut length | mm | 44 | 44 | 44 |
| Number of crimps | number/inch | 4.9 | 5.0 | 0 |

TABLE 2-continued

|  |  | Example 7 | Example 8 | Com. Ex. 5 |
| --- | --- | --- | --- | --- |
| Crimp index | % | 3.2 | 3.3 | 0 |
| Crimp index/ number of crimps |  | 0.65 | 0.66 | — |
| Spun yarn property |  |  |  |  |
| Cotton yarn number |  | 20 | 20 | — |
| Strength | g | 4100 | 4032 | — |
| Tensile modulus | g/d | 437 | 452 | — |
| Elongation at break | % | 3.9 | 3.7 | — |

EXAMPLE 9

A spinning dope comprising 14% by weight of cis-polybenzoxazole having an intrinsic viscosity of 30 dl/g dissolved in polyphosphoric acid was extruded at 160° C. and extrusion amount of 0.122 cc per hole from a nozzle having 334 holes having an orifice diameter of 0.22 mm. The fiber-shaped dope extruded from the nozzle was passed through a 22 cm air gap, drawn therein, passed through a coagulation bath adjusted to about 22° C., successively washed with water through 5 or more pairs of rollers while being carried at a speed of about 200 m/min, dried without being once wound up, applied with a spinning finish, and wound up. The filament tenacity of the obtained fiber was 42 g/d.

The fibers thus obtained were combined into a 30,000 denier tow and crimped in a crimper box having a roller width of 20 mm. The number of crimps was 12 per inch and the crimp index was 13%.

The crimped tow was cut into a predetermined length of 44 mm with a rotary cutter to give staple fibers. The cutting blades used had a shape as shown in FIG. 3(b) and the tip angle of 65°.

EXAMPLE 10

Staple fibers were manufactured in the same manner as in Example 9, using cutting blades having a tip angle of 50°.

COMPARATIVE EXAMPLE 6

Staple fibers were manufactured in the same manner as in Example 9, using cutting blades having a tip angle of 30°.

COMPARATIVE EXAMPLE 7

Staple fibers were manufactured in the same manner as in Example 9, using cutting blades having a tip angle of 45°.

COMPARATIVE EXAMPLE 8

A polyester tow having a filament tenacity of 4.5 g/d was crimped by a crimper and cut with a rotary cutter in the same manner as in Example 9, to give staple fibers. The cutting blades used had a tip angle of 30°.

COMPARATIVE EXAMPLE 9

Staple fibers were manufactured in the same manner as in Example 9, using cutting blades having a tip angle of 95°. However, the cutting resistance was so great that the test was not continued due to the lack of sharpness of the blade.

The condition of the cutting blades after use in the above-mentioned Examples and Comparative Examples is shown in Table 3. In addition, the condition of the cutting blades before and after use for 20 hours in Example 9 and Comparative Example 6 is examined by an optical microscope. The microscopic photographs were transcribed in the drawings of FIG. 5.

Figure 5:
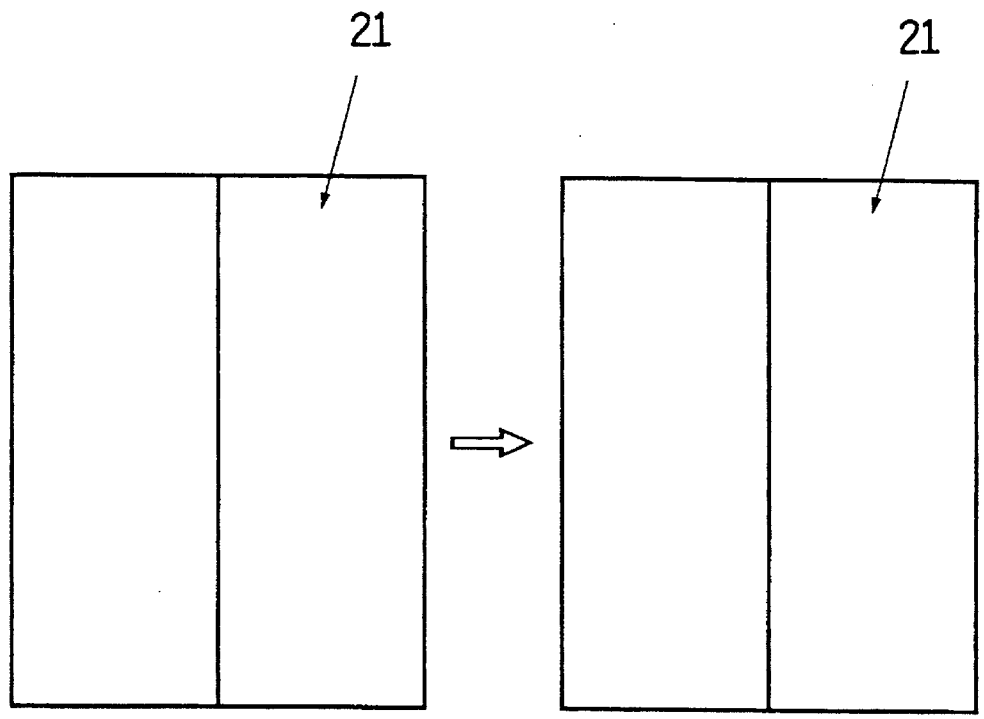
FIG. 5(a) is an enlarged view of the edge of the cutting blade before and after use in Example 9 to be described later.
FIG. 5(b) is an enlarged view of the edge of the cutting blade before and after use in Comparative Example 6 to be described later.
Figure 5:
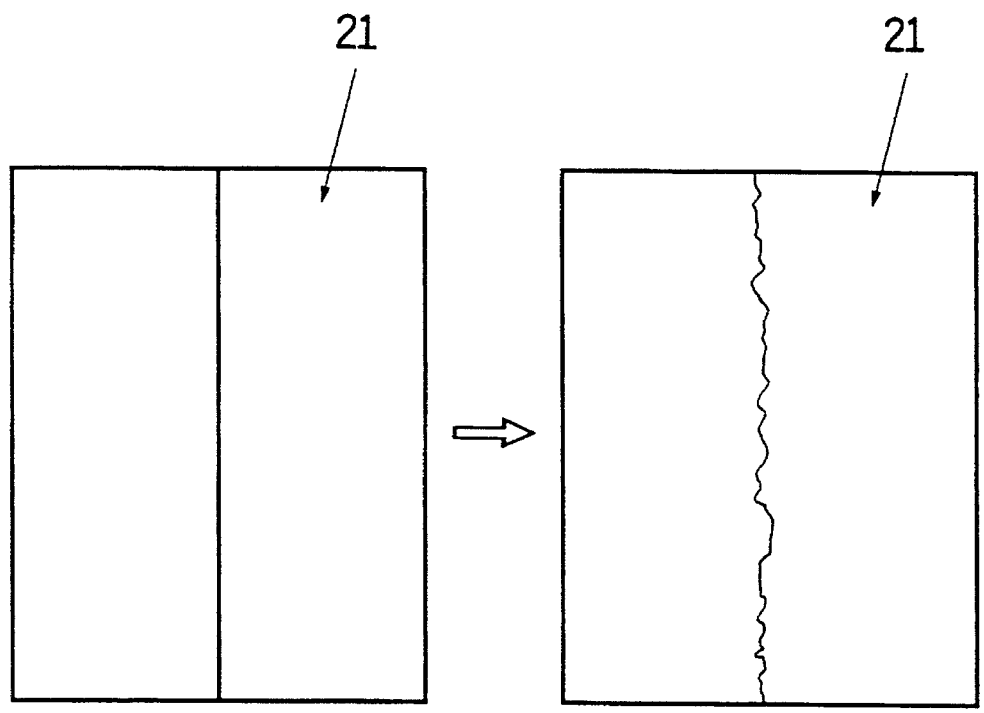

As is evident from Table 3 and FIG. 5, the cutting blade of the present invention suffered no damage to the blade and was extremely superior in durability.

TABLE 3

|  | Ex. 9 | Ex. 10 | Com. Ex. 6 | Com. Ex. 7 | Com. Ex. 8 |
| --- | --- | --- | --- | --- | --- |
| angle of cutting blade | 65° | 50° | 30° | 45° | 30° |
| after use | ⊙ | ⊙ | X | Δ | ⊙ |

⊙: No damage
Δ: Damage in part
X: Damage in the entirety of the blade

The crimped polybenzazole staple fibers of the present invention are superior in crimp property and are useful for manufacturing spun yarn and unwoven fabric. According to the method for manufacturing crimped polybenzazole staple fibers of the present invention, crimped polybenzazole staple fibers superior in spinnability can be manufactured with ease. In addition, the cutting blade of the present invention stands a long time use for manufacturing staple fibers from a continuous filaments tow of high tenacity fibers.

What is claimed is:

1. A crimped polybenzazole staple fiber which satisfies the following specifications at the same time:

(1) $2 \leqq$ number of crimps (number/inch) $\leqq 40$ (2) $2 \leqq$ crimp index (%) $\leqq 30$ (3) $0.3 \leqq$ crimp index/number of crimps $\leqq 3.0$.

* * * * *